United States Patent
Hughes, Jr.

(10) Patent No.: US 9,766,828 B2
(45) Date of Patent: Sep. 19, 2017

(54) MAILBOX COMMUNICATION MECHANISM WITH OWNERSHIP LOCKING

(71) Applicant: Samsung Electronics Co., Ltd., Suwon-si, Gyeonggi-do (KR)

(72) Inventor: John H. Hughes, Jr., Morgan Hill, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 266 days.

(21) Appl. No.: 14/751,130

(22) Filed: Jun. 25, 2015

(65) Prior Publication Data
US 2016/0378381 A1    Dec. 29, 2016

(51) Int. Cl.
| | |
|---|---|
| G06F 12/00 | (2006.01) |
| G06F 3/06 | (2006.01) |
| G06F 12/14 | (2006.01) |
| G06F 17/30 | (2006.01) |
| G06F 15/167 | (2006.01) |
| G06F 9/54 | (2006.01) |

(52) U.S. Cl.
CPC .......... *G06F 3/0622* (2013.01); *G06F 3/0637* (2013.01); *G06F 3/0673* (2013.01); *G06F 9/54* (2013.01); *G06F 12/1466* (2013.01); *G06F 15/167* (2013.01); *G06F 17/30171* (2013.01)

(58) Field of Classification Search
None
See application file for complete search history.

(56) References Cited

U.S. PATENT DOCUMENTS

| | | | |
|---|---|---|---|
| 5,669,002 A | 9/1997 | Buch | |
| 5,774,731 A | 6/1998 | Higuchi et al. | |
| 7,487,153 B2 | 2/2009 | Makhervaks et al. | |
| 8,495,311 B2 * | 7/2013 | Martin | G06F 12/00 711/150 |
| 2013/0290286 A1 | 10/2013 | Su et al. | |

\* cited by examiner

*Primary Examiner* — Adam M Queler
*Assistant Examiner* — Jason Blust
(74) *Attorney, Agent, or Firm* — Renaissance IP Law Group LLP

(57) ABSTRACT

A Lock register can be associated with a mailbox. The Lock register can store a claim ID of a process that has allocated the mailbox. The Lock register can include a Lock port and a Lock Clear port, used to claim and release the Lock register. The Lock register only permits data to be written to the Lock Register when the Lock register is not currently allocated, and the Lock Clear port only permits the process that has allocated the Lock register to write a value.

17 Claims, 12 Drawing Sheets

_MAILBOX COMMUNICATION MECHANISM WITH OWNERSHIP LOCKING_

FIELD

The inventive concept pertains to sharing computer data, and more particularly to sharing data between computer processes using a shared mailbox.

BACKGROUND

A mailbox is a general purpose communication mechanism between two independent computer resources. Those resources can be software processes running on a single processor, or two software processes running on different processors. The complete mailbox channel generally incorporates a mailbox mechanism in each direction when the resources are on different processors or when a full duplex channel is desired.

One way to use mailboxes is to allocate one mailbox to each initiator that might need to send a message to the responder. But allocating one mailbox to each initiator can result in an excess of idle mailboxes.

When the number of mailboxes is less than the number of initiators, a resource arbitrator is needed to respond to the mailbox requests and releases. The resource arbitrator is responsible for allocating mailboxes from the pool of idle mailboxes, and then returning them to the pool upon release. A resource arbitrator works well, but adds another level of overhead to the mailbox usage model. For example, in the extreme case, where there are N initiators but only one mailbox, the resource arbitrator might need to queue a number of mailbox pending requests while the mailbox is in use.

An alternative to a resource arbitrator is to permit the initiators to manage the allocation and release of the mailboxes directly. The difficulty with this approach is that when an initiator claims a mailbox, that initiator needs to be certain that no other initiator has also claimed it.

A need remains for a way to permit initiators to allocate a mailbox for itself without concern that another initiator can use that mailbox.

DETAILED DESCRIPTION

The basic mailbox mechanism includes three distinct components:

a) A data storage component that holds the data that is to be passed via the mailbox exchange. The data is written by the initiator (also called the sender or requester) of the exchange and is read by the responder (also called the receiver) of the exchange. This data storage can be direct with the data stored within the mailbox mechanism, or can be indirect, where the mailbox stores a pointer or address of the data in some common memory structure that the initiator and responder can both access.

b) A status component that is used by the initiator and responder to communicate the progress of the movement of the data to the responder. The status can also communicate the availability of the mailbox for use/reuse.

c) An attention component that is used as the physical means that the responder is notified that it needs to check the mailbox for new data. This component can be a processor interrupt due to the asynchronous nature of the initiator and responder processes. This component can be shared amongst multiple mailbox entities by simply ORing the individual attention components. In that case, each potential responder will need to check a set of secondary status indicators to resolve if it needs to respond to a mailbox attention notice.

The two sides of the mailbox channel, initiator and responder, use the status component while the mailbox transfer is active. The mailbox operation sequences through multiple states as the transfer progresses. A typical sequence of states is:

a) Idle: The mailbox is not currently in use.
b) Request: The initiator requests use of a mailbox.
c) Allocated: The mailbox has been reserved for use by the initiator, but has not been loaded with data.
d) Written: The mailbox contains the information to transfer to the responder.
e) Attention: The mailbox has asserted a signal to the responder to indicate that mailbox service is required.
f) Read: The responder has removed the data from the mailbox.
g) Release: The responder has indicated that the mailbox is no longer needed.
h) Idle: The mailbox state returns to 'not in use'.

Figure 1:
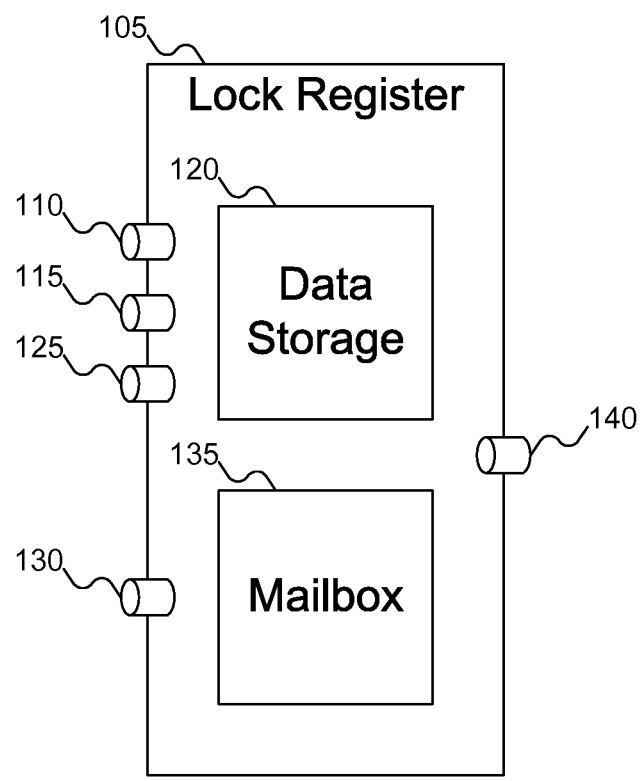
FIG. 1 shows a Lock register that can be associated with a mailbox to enable an initiator to lock the mailbox for itself, according to an embodiment of the inventive concept.

To permit initiators to handle allocation of mailboxes directly, a Lock register can be used. An embodiment of such a Lock register is shown in FIG. 1. In FIG. 1, Lock register 105 includes has two access ports: Lock port 110 and Lock Clear port 115. Lock Clear port 115 can be an ordinary read/write (RW) register interface to data storage 120. In contrast, Lock port 110 is fully readable, but conditionally writeable to data storage 120. Reads to Lock port 110 return the current value of data storage 120. If the current value of data storage 120 is zero, the value written to the Lock port can be written into data storage 120, which immediately changes its value to that of the written data. But if the value of data storage 120 is non-zero, then any write to Lock port 110 is discarded, and causes no change in the value stored in Lock register 105. In other embodiments of the inventive concept, a value other than 0 can be used to represent that Lock register 105 is not allocated and in use.

In one embodiment of the inventive concept, data storage 120 is 32 bits wide, so there are $2^{32}-1$ values that will cause Lock register 105 to lock, and only one value (0) that will cause it to unlock. The unlock value (also called the clear value) can only be successfully written through Lock Clear port 115.

If each contending initiator is assigned a unique, non-zero, "claim" ID, then an initiator can contend for a mailbox by writing that claim ID to Lock port 110, and then reading Lock port 110 to see what value is present in Lock register 105 after the write. If the mailbox is Idle (i.e., data storage 120 stores the value 0) then the initiator's claim ID can be successfully written to data storage 120 and that initiator can be allocated the mailbox. If another initiator has already been allocated that mailbox, then Lock register 105 will have that requester's Claim ID as its value. When the initiator reads Lock port 110 from Lock register 105, the read will return the other initiator's claim ID rather than the initiator's claim ID, and the initiator will know that it was not allocated the mailbox.

Figure 2:
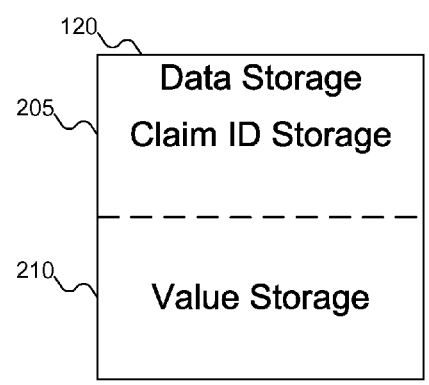
FIG. 2 shows detail of the data storage in the Lock register of FIG. 1.

The usage of Lock Clear 115 port is limited to the initiator that has the claim ID that matches the current value in data storage 120. Lock Clear port 115 provides a mechanism for an initiator that was allocated the mailbox to release it back to the Idle state, by writing all zeros to the register. Note that Lock Clear port 115 allows any data value to be written. Therefore, as shown in FIG. 2 data storage 120 can be split between the claim ID bits (stored in claim ID storage 205) and some other information bits (stored in value storage 210). Not until the contents of Lock register 105 are all zeros is the lock released.

This locking mechanism allows for a variety of software-implemented algorithms for the initiator to claim a mailbox. For example, an initiator can loop between writing and reading Lock port 110 (i.e., a spin lock) until data storage 120 of Lock register 105 stores the initiator's claim ID. Alternatively, an initiator can issue a series of writes to any number of mailbox Lock ports, scan those Lock ports to see if the initiator was allocated any of the Lock registers, then release any extra Lock registers.

Permitting an initiator to allocate more than one Lock register 105 also provides a mechanism by which different initiators can be assigned different priorities. For example, initiators that are to be given a higher priority can be permitted to allocate from a larger set of mailboxes than initiators with a lower priority. In addition, the mailboxes different initiators can allocate can be distinct or overlap. Put another way, there can be defined sets of mailboxes used for different priority levels (distinct mailbox sets), or individual mailboxes can be allocated by different initiators with different priorities.

As noted above, data storage 120 can include value storage 210. Value storage 210 provides a mechanism by which Lock register 105 can store an auxiliary data value. Since Lock register 105 is available for the responder (or indeed, any initiator or responder) to read, value storage 210 can be used as a unique selector for a set of responder actions. This can take the form of a branch table where the value storage 210 is used as an offset into a table of pointers to the associated program code to handle that mailbox.

Another embodiment of the inventive concept can have data storage 120 as a single field, but the bits divided between bits used for the claim ID and for other purposes. In such an embodiment off the inventive concept, a subset of the value stored in data storage 120 can be used as an auxiliary data value.

The above description suggests that Lock port 110 and Lock Clear port 115 can be used both to both issue instructions to Lock register 105 and to read any results back. In a more general situation, these ports can be used to send specific instructions, with other ports being used for other instructions and for output. Thus, for example, returning to FIG. 1, Lock register 105 can include read port 125, which can be used to prompt Lock register 105 to read data from data storage 120, data in port 130, which can be used to input data to mailbox 135, and output port 140, which can be used to receive output information from Lock register 105 (such as values stored in either data storage 120 or mailbox 135).

Figure 3:
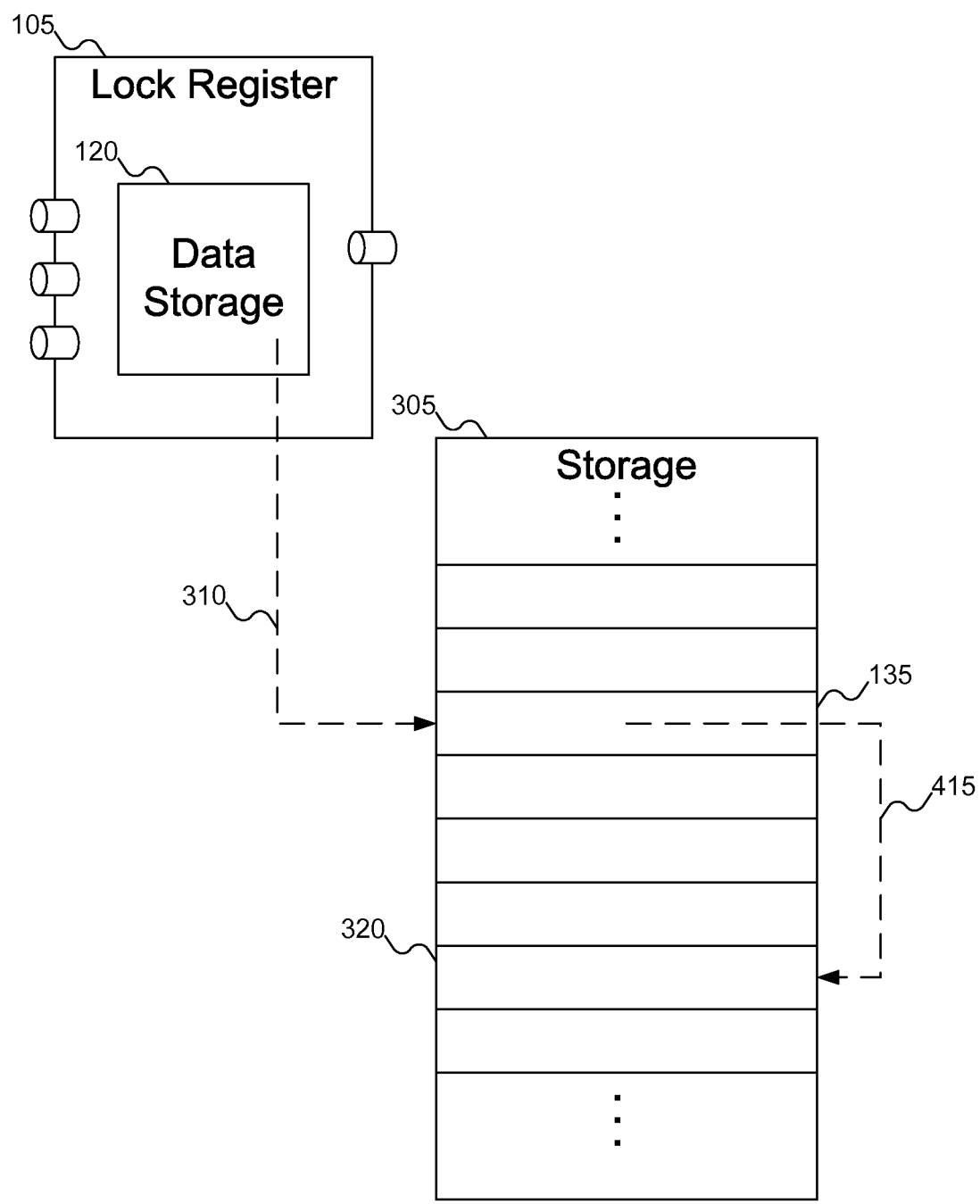
FIG. 3 shows an alternative embodiment of the Lock register of FIG. 1.

FIG. 3 shows an alternative embodiment of Lock register 105 of FIG. 1. In contrast to FIG. 1, where Lock register 105 includes mailbox 135, in FIG. 3 Lock register 105 is associated with mailbox 135, which is external to Lock register 105. In FIG. 3, mailbox 135 is shown as a portion of storage 305: storage 305 can be any desired form of storage, including Random Access Memory (RAM), a hard disk drive, a Solid State Drive (SSD), or network-attached storage, among other possibilities. The association between Lock register 105 and mailbox 135 is shown as dashed arrow 310.

In addition, as described above, the mailbox can store the information to be shared between the initiator and responder either directly or indirectly. If the information were stored in mailbox 135, that would be direct storage in the mailbox mechanism. In contrast, FIG. 3 shows an indirect storage. Dashed arrow 315 shows a reference from mailbox 135 to location 320. Although FIG. 3 shows location 320 as being within storage 305 (the same storage as mailbox 135), location 320 can be any desired storage, whether on the same device or device class as storage 305 or a different device or device class. Dashed arrow 315 can be implemented as a pointer or any other desired reference mechanism for specifying where the actual information being sent from the initiator to the responder is stored. Depending on the format used to store information at location 320, the reference mechanism might simply be a different memory address (for example, when location 320 is in the same storage device as mailbox 135), a combination of a device identifier and address (for when location 320 is on the same machine as mailbox 135 but on a different storage device), or a Uniform Resource Identifier (URI) (for when location 320 is accessible from but on a different machine from mailbox 135), among other possibilities.

Figure 4:
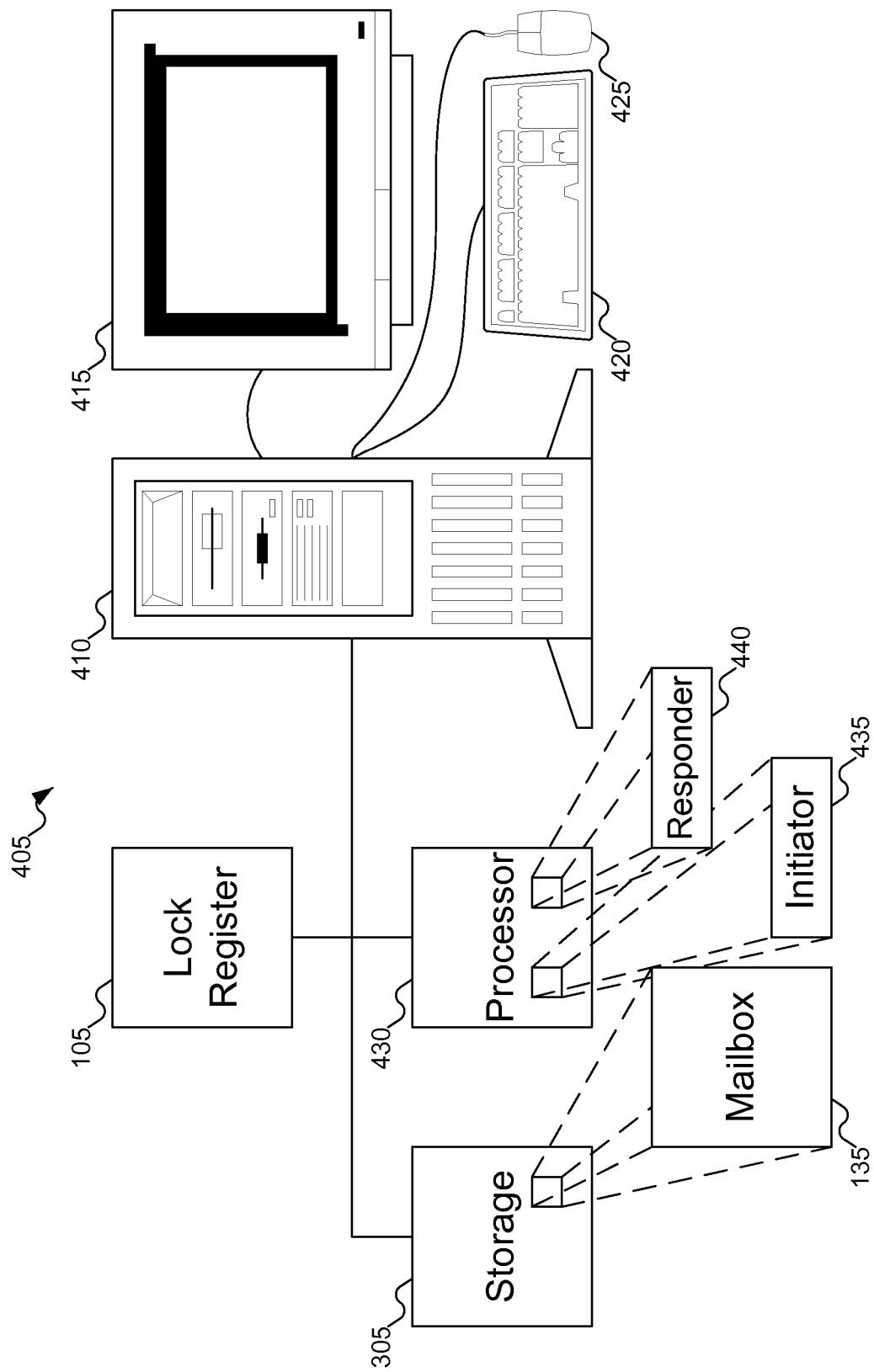
FIG. 4 shows a computer system using the Lock register of FIG. 3.

FIG. 4 shows a computer system using Lock register 105 of FIG. 3. In FIG. 4, computer system 405 is shown as including computer 410, monitor 415, keyboard 420, and mouse 425. A person skilled in the art will recognize that other components can be included with computer system 405: for example, other input/output devices, such as a printer. In addition, computer system 405 can include conventional internal components, such as central processing unit 430 or storage 305 (which can include mailbox 135). Although not shown in FIG. 4, a person skilled in the art will recognize that computer system 405 can interact with other computer systems, either directly or over a network (not shown) of any type. Finally, although FIG. 4 shows computer system 405 as a conventional desktop computer, a person skilled in the art will recognize that computer system 405 can be any type of machine or computing device capable of providing the services attributed herein to computer system 405, including, for example, a laptop computer, a tablet computer, a personal digital assistant (PDA), or a smart phone, among other possibilities.

Processor 430 can execute one or more processes that can act as either initiators, such as initiator 435, or responders, such as responder 440, using the mailbox mechanism. Such initiators can attempt to allocate Lock register 105 so as to secure mailbox 135 for their use to send information to a responder. Then, when the communication is complete, such an initiator can release Lock register 105 for another initiator to use.

While FIG. 4 shows initiator 435 and responder 440 as executing within common processor 430, initiator 435 and responder 440 can be executing on different processors, and on the same or on different computer systems. As long as initiator 435 and responder 440 can both access mailbox 135, it does not matter on which processors they are executing.

Figure 5:
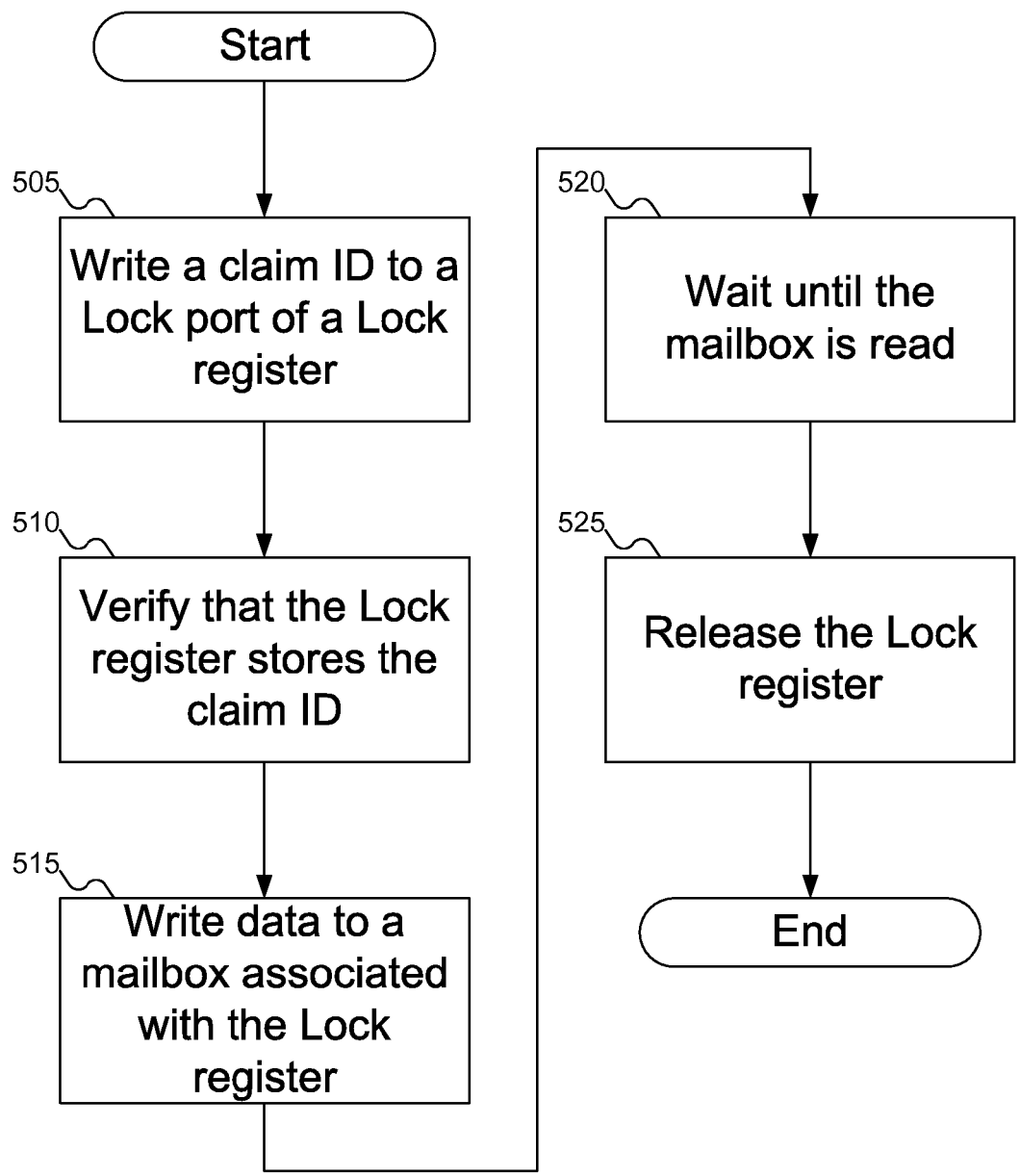
FIG. 5 shows a flowchart of a procedure for an initiator to use a Lock register, according to an embodiment of the inventive concept.

FIG. 5 shows a flowchart of a procedure for an initiator to use a Lock register in connection with a mailbox, according to an embodiment of the inventive concept. In FIG. 5, at block 505, initiator 435 can write its claim ID to Lock register 105. At block 510, initiator 435 can verify that Lock register 105 stores the claim ID of initiator 435. At block 515, initiator 435 can write data to mailbox 135. At block 520, initiator 435 can wait until responder 440 reads mailbox 135. And at bock 525, initiator 435 can release Lock register 105.

In FIG. 5 (and in the other flowcharts below), one embodiment of the inventive concept is shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Figure 6:
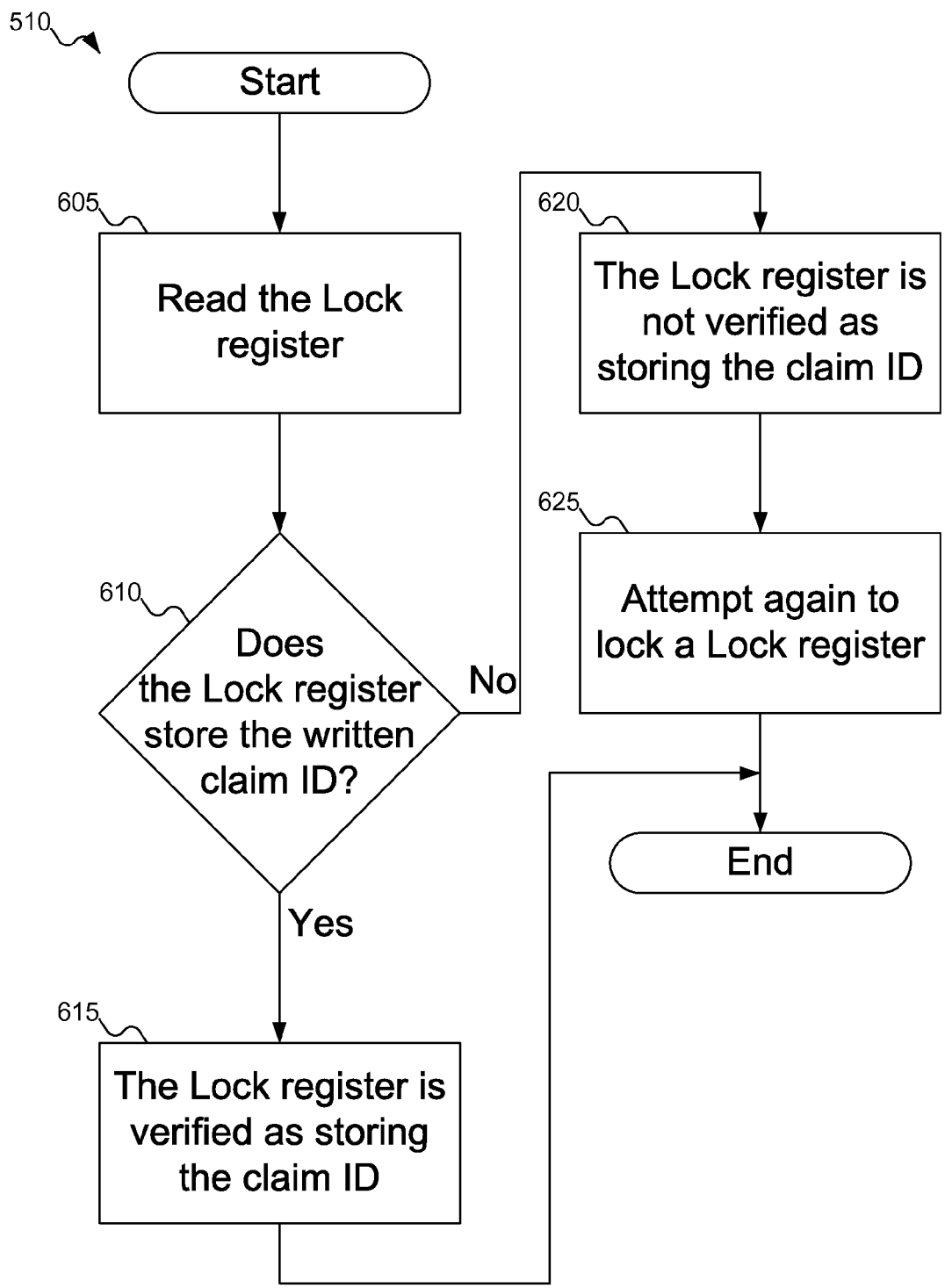
FIG. 6 shows a flowchart of a procedure for an initiator to verify that the initiator has claimed a Lock register, according to an embodiment of the inventive concept.

FIG. 6 shows a flowchart of a procedure for an initiator to verify that the initiator has claimed a Lock register, according to an embodiment of the inventive concept. At block 605, initiator 435 can read Lock register 105. At block 610, initiator 435 can determine if Lock register 105 stores the claim ID of initiator 435. If so, then at block 615 initiator 435 can be certain that initiator 435 has a lock on mailbox 135.

On the other hand, if at block 610 initiator 435 determines that Lock register 105 does not store the claim ID of initiator 435, then at block 620 initiator 435 can be certain that initiator 435 does not have a lock on mailbox 135. At block 625, initiator 435 can attempt again to lock a Lock register.

Figure 7:
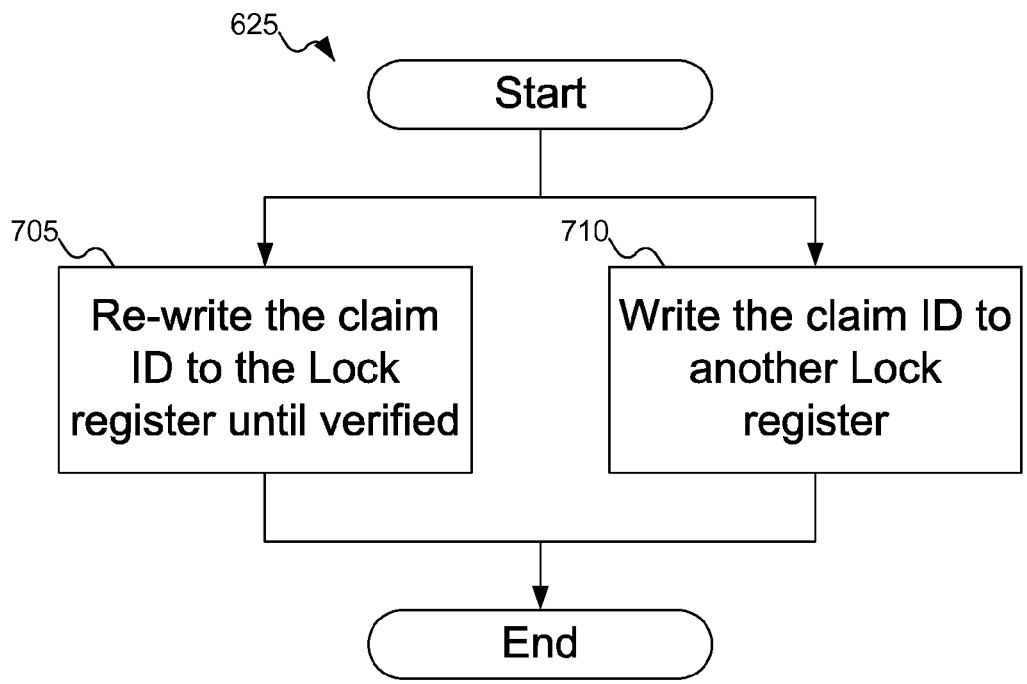
FIG. 7 shows a flowchart of a procedure for an initiator to address a failure to claim a Lock register, according to an embodiment of the inventive concept.

FIG. 7 shows a flowchart of a procedure for an initiator to address a failure to claim a Lock register, according to an embodiment of the inventive concept. In FIG. 7, at block 705, initiator 435 can re-write its claim ID to Lock register 105, repeating this process until initiator 435 has successfully allocated Lock register 105. Alternatively, at block 710, initiator 435 can attempt to write its claim ID to another Lock register, in an attempt to allocate a different mailbox. As discussed above, if initiator 435 is given access to multiple different mailboxes, initiator 435 can perform both of blocks 705 and 710, if initiator 435 was not able to successfully allocate any mailbox in its first attempt to do so.

Figure 8:
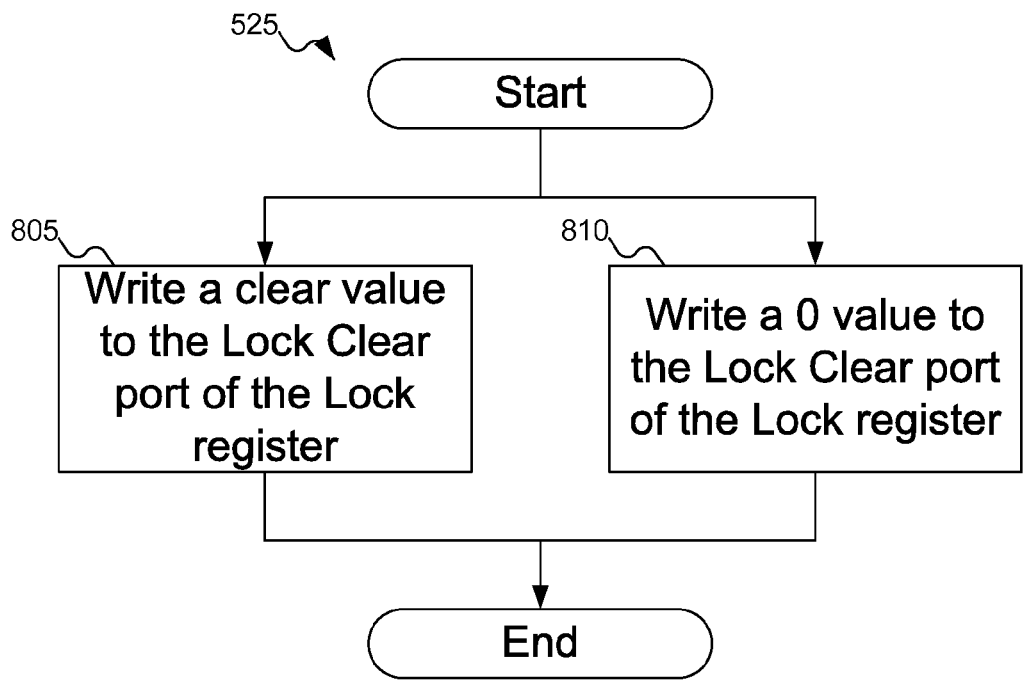
FIG. 8 shows a flowchart of a procedure for an initiator to release a Lock register, according to an embodiment of the inventive concept.

FIG. 8 shows a flowchart of a procedure for an initiator to release a Lock register, according to an embodiment of the inventive concept. In FIG. 8, at block 805, initiator 435 can write a clear value to Lock Clear port 115 of Lock register 105. In the case that the value to release Lock register 105 is 0, then as shown in block 810, initiator 435 can write a 0 to Lock Clear port 115 of Lock register 105. As discussed above, 0 represents a useful value to represent that a mailbox is unallocated, but any desired value can be used to represent that the mailbox is unallocated. Note that block 805 can also be used by initiator 435 to store a value used by either initiator 435 or responder 440, without releasing Lock register 105.

Figure 9:
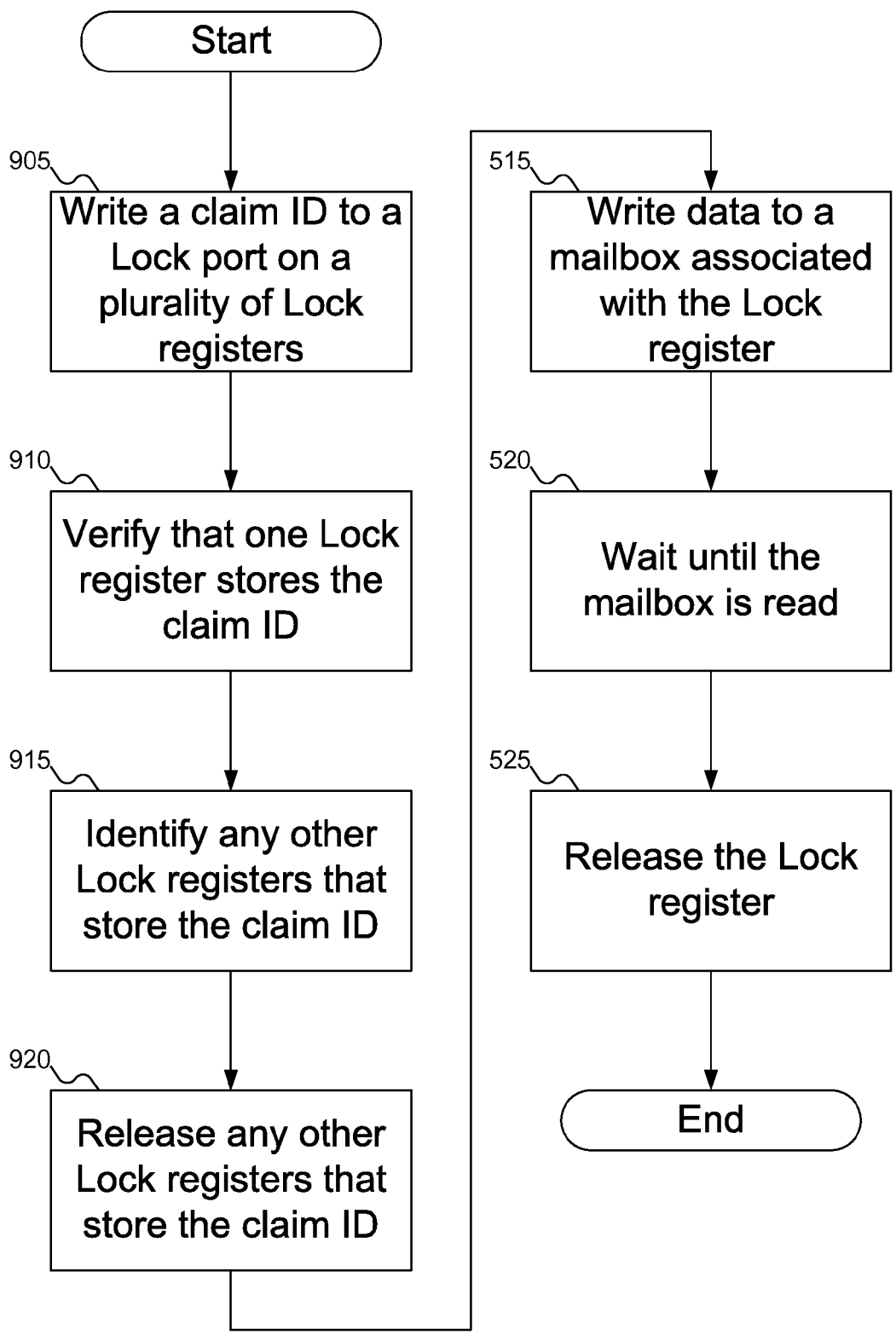
FIG. 9 shows a flowchart of a procedure for an initiator to use a Lock register, according to an alternative embodiment of the inventive concept.

FIG. 9 shows a flowchart of a procedure for an initiator to use a Lock register, according to an alternative embodiment of the inventive concept. In contrast to the flowchart of the procedure shown in FIG. 5, the flowchart of FIG. 9 can be used when an initiator can allocate from a plurality of mailboxes. (Of course, even when an initiator has access to more than one mailbox, the initiator can still use the flowchart of the procedure shown in FIG. 5 in an attempt to allocate only one mailbox at a time.) In FIG. 9, at block 905, initiator 435 can write its claim ID to Lock port 110 on any number of Lock registers 105. At block 910, initiator 435 can verify that at least one Lock register 105 stores the claim ID of initiator 435. At block 915, initiator 435 can identify any other Lock registers 105 that it successfully allocated, and at block 920, initiator 435 can release those Lock registers 105 (since initiator 435 only needs one Lock register to communicate with a given responder 440). Note that if initiator 435 needs to communicate with more than one responder 440, initiator 435 can keep as many mailboxes 135 as it needs allocated: keeping only one mailbox 135 allocated represents the case where initiator 435 only needs to communicate with one responder 440.

At this point, initiator 435 has a mailbox 135 allocated for communication with responder 440. Operation can then proceed as described in FIG. 5. At block 515, initiator 435 can write data to mailbox 135. At block 520, initiator 435 can wait until responder 440 reads mailbox 135. And at bock 525, initiator 435 can release Lock register 105.

Initiator 435 can accomplish block 920 to release unneeded Lock registers 105 simply by writing the clear value (e.g., 0) to Lock Clear port 115 on those Lock registers 105. But note that initiator 435 does not need to be so selective as to only clear Lock registers 105 it does not need. Initiator 435 can accomplish the same result by writing the clear value (e.g., 0) to Lock Clear port 115 on all Lock registers 105 except for Lock register 105 associated with mailbox 135 initiator 435 intends to use. Recall that Lock register 105 only processes writes to Lock Clear port 115 from processes with the claim ID stored in data storage 120: any other writes to Lock Clear port 115 are ignored. Thus, if Lock register 105 is locked for use by initiator 435, writing the clear value to Lock Clear port 115 on Lock register 105 will release Lock register 105. But if Lock register 105 is not locked for use by initiator 435, Lock register 105 will ignore the write to Lock Clear Port 115, preventing any change in its status. This prevents initiator 435 from inappropriately releasing Lock register 105 when it has been allocated to a different initiator.

Figure 10:
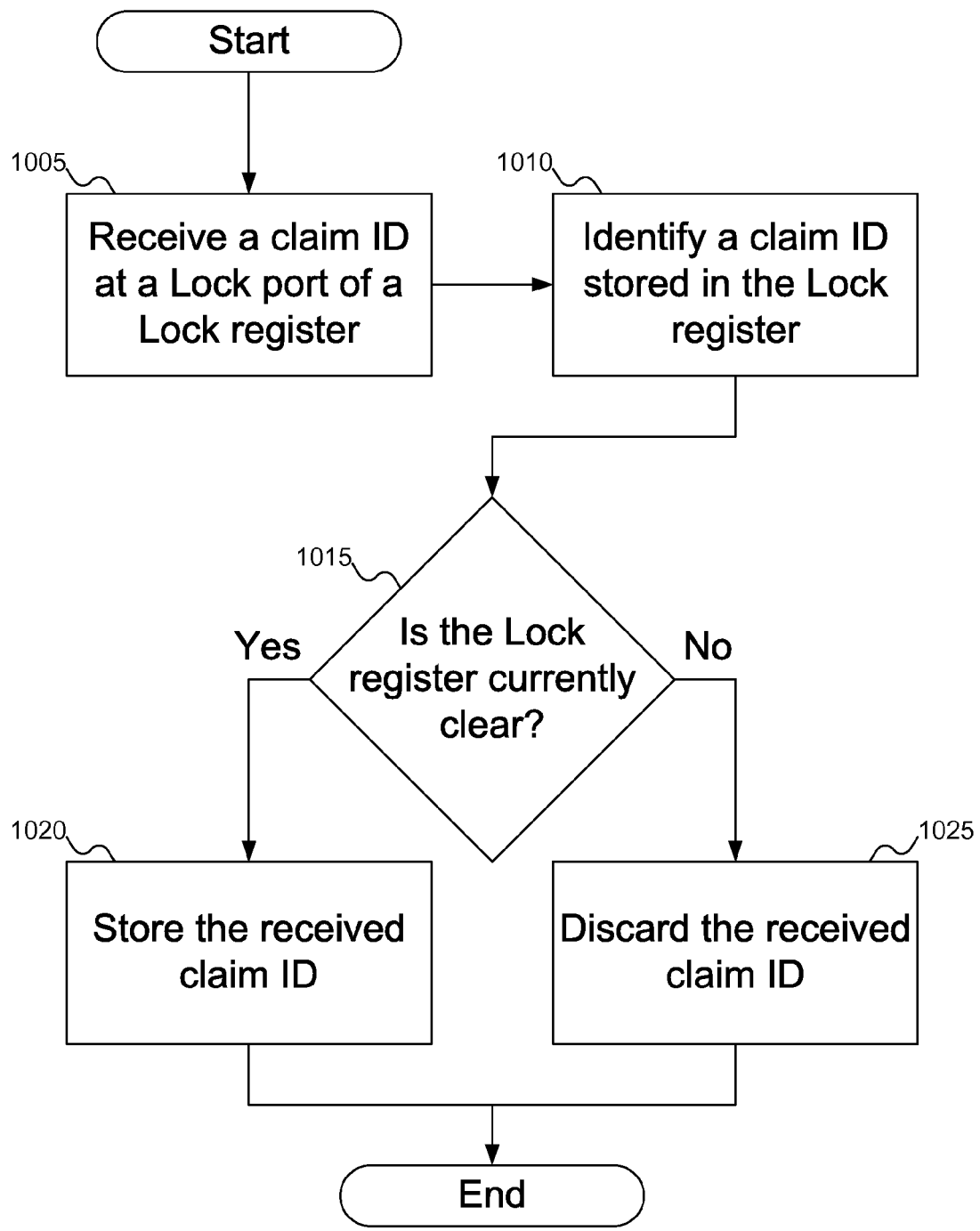
FIG. 10 shows a flowchart of a procedure for a Lock register to process a request to claim Lock register 105, according to an embodiment of the inventive concept.

FIG. 10 shows a flowchart of a procedure for a Lock register to process a request to claim Lock register 105, according to an embodiment of the inventive concept. In FIG. 10, at block 1005, Lock register 105 receives a claim ID from initiator 435 at Lock port 110. At block 1010, Lock register 105 identifies the claim ID it currently stores. Note that the claim ID currently stored can be the clear value, indicating that Lock register 105 is not currently allocated to an initiator. At block 1015, Lock register 105 examines the claim ID currently stored. If the stored claim ID is the clear value, then at block 1020 Lock register 105 stores the received claim ID, allocating Lock register 105 to initiator 435. Otherwise, if the stored claim ID does not store the clear value, then at block 1025, Lock register 105 discards the received claim ID.

Figure 11:
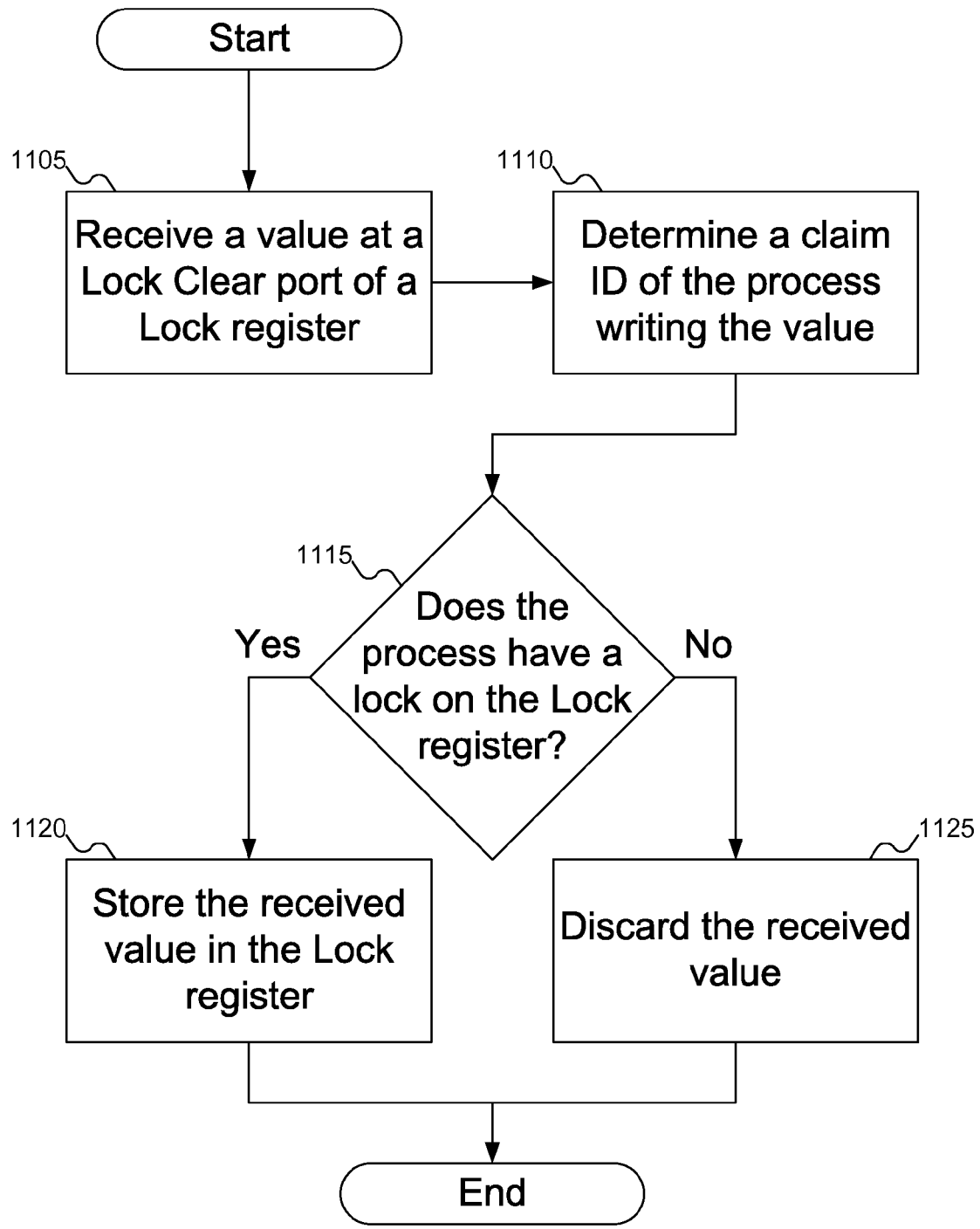
FIG. 11 shows a flowchart of a procedure for a Lock register to process a request to release Lock register 105, according to an embodiment of the inventive concept.

FIG. 11 shows a flowchart of a procedure for a Lock register to process a request to release Lock register 105, according to an embodiment of the inventive concept. In FIG. 11, at block 1105, Lock register 105 receives a value from initiator 435 at Lock Clear port 115. At block 1110, Lock register 105 identifies the claim ID it currently stores. Note that the claim ID currently stored can be the clear value, indicating that Lock register 105 is not currently allocated to an initiator. At block 1115, Lock register 105 compares the claim ID of initiator 435 to the claim ID currently stored in Lock register 105. If the claim ID of initiator 435 matches the stored claim ID, then Lock register 105 is currently allocated to initiator 435, and at block 1120, Lock register 105 stores the received value in data storage 105. Note that if the received value is the clear value, then initiator 435 has released Lock register 105. Otherwise, if the claim ID of initiator 435 does not match the stored claim ID, then at block 1125, Lock register 105 discards the received value.

Figure 12:
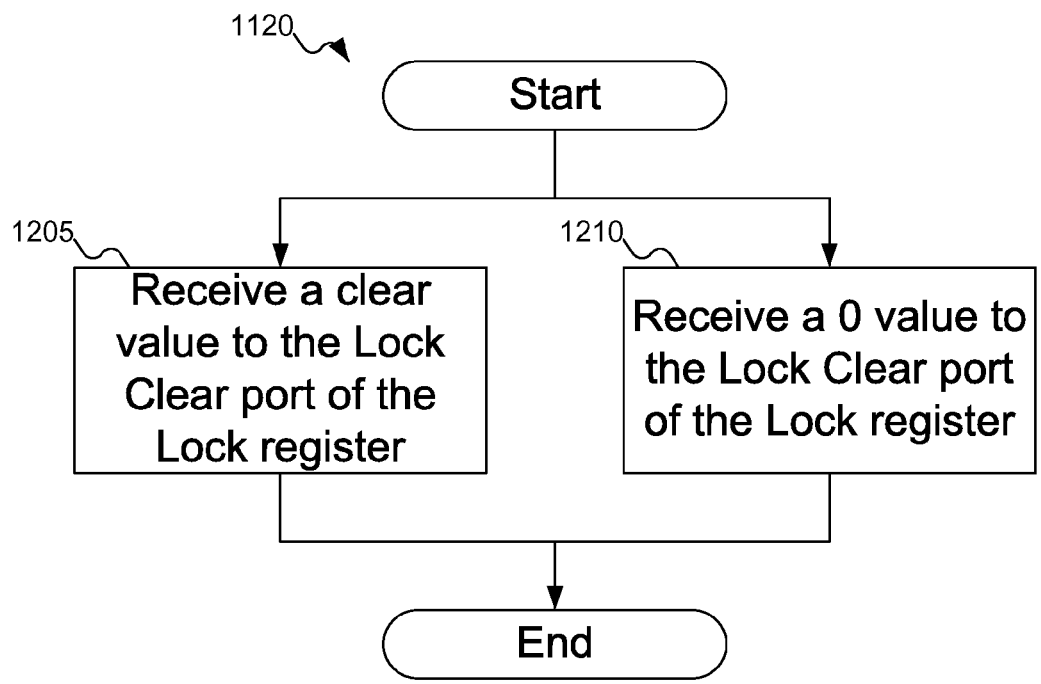
FIG. 12 shows more detail about the flowchart of FIG. 11 to release a Lock register, according to an embodiment of the inventive concept.

FIG. 12 shows more detail about the flowchart of FIG. 11 to release a Lock register, according to an embodiment of the inventive concept. In FIG. 12, at block 1205, Lock register 105 receives a clear value from initiator 435 at Lock Clear port 115. In the case that the value to release Lock register 105 is 0, then as shown in block 1210, Lock register 105 can receive a 0 from initiator 435 at Lock Clear port 115. As discussed above, 0 represents a useful value to represent that a mailbox is unallocated, but any desired value can be used to represent that the mailbox is unallocated. Note that block 1205 can also be used by Lock register 105 to store a value used by either initiator 435 or responder 440, without releasing Lock register 105.

Figure 13:
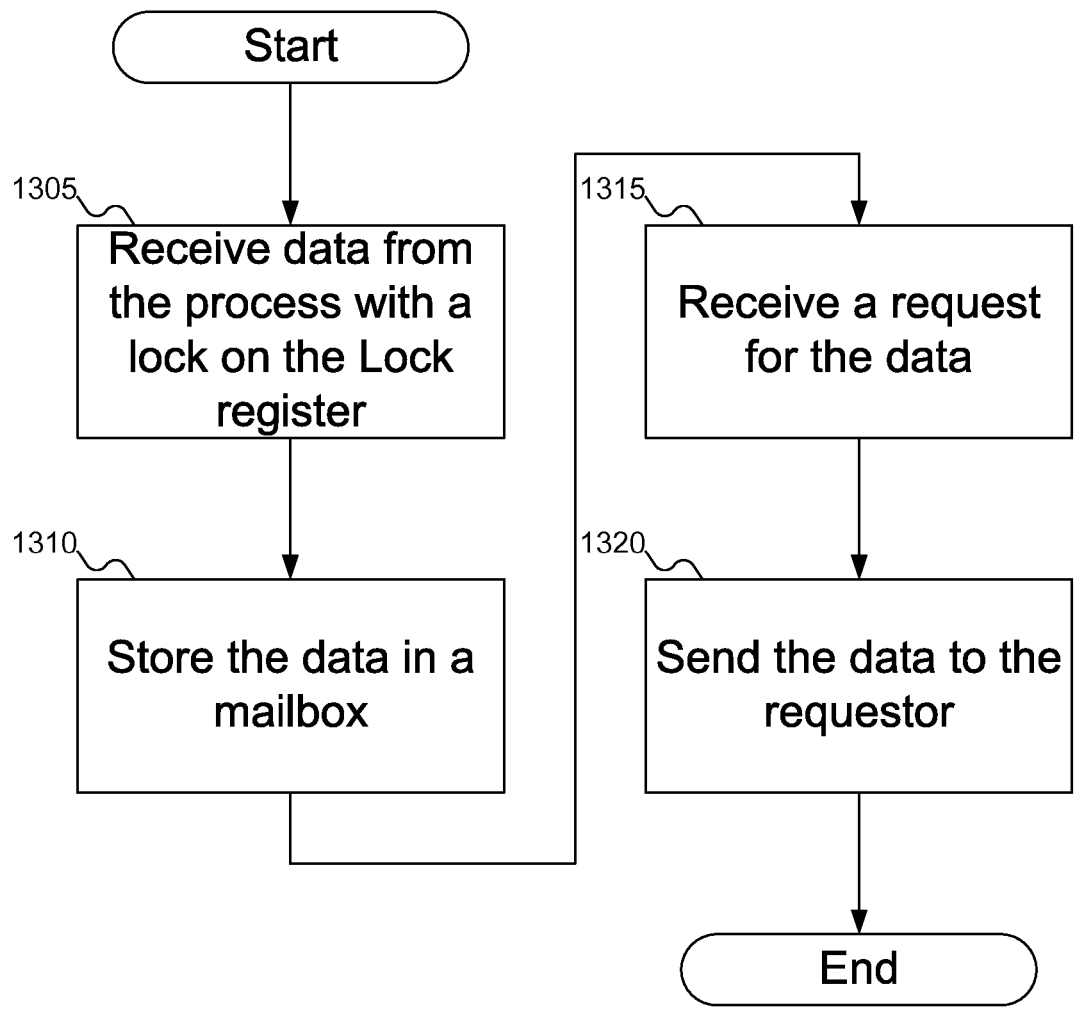
FIG. 13 shows a flowchart for a Lock register to use a mailbox in the Lock register, according to an embodiment of the inventive concept.

FIG. 13 shows a flowchart for a Lock register to use a mailbox in the Lock register, according to an embodiment of the inventive concept. In FIG. 13, at block 1305, Lock register 105 receives data from initiator 435. At block 1310, Lock register 105 stores the data in mailbox 135. At block 1315, Lock register 105 receives a request from responder 440 to read the data. At block 1320, Lock register 105 sends the data to responder 440.

Embodiments of the inventive concept can extend to the following statements, without limitation:

An embodiment of the inventive concept includes a Lock register, comprising: data storage; a Lock port; and a Lock Clear port, wherein: Lock register stores a first value written to the Lock port in the data storage if and only if the data storage is clear, and Lock register stores a second value written to the Lock Clear port in the data storage if and only if a writer of the value has an ID that matches a second ID in the data storage.

An embodiment of the inventive concept includes a Lock register, comprising: data storage; a Lock port; and a Lock Clear port, wherein: Lock register stores a first value written to the Lock port in the data storage if and only if the data storage is clear, Lock register stores a second value written to the Lock Clear port in the data storage if and only if a writer of the value has an ID that matches a second ID in the data storage, and the Lock register ignores the first value written to the Lock port if the data storage is not clear.

An embodiment of the inventive concept includes a Lock register, comprising: data storage; a Lock port; and a Lock Clear port, wherein: Lock register stores a first value written to the Lock port in the data storage if and only if a third value stored in the data storage is 0, Lock register stores a second value written to the Lock Clear port in the data storage if and only if a writer of the value has an ID that matches a second ID in the data storage, and the Lock register ignores the first value written to the Lock port if the data storage is not clear.

An embodiment of the inventive concept includes a Lock register, comprising: data storage including a claim ID storage to store the second ID and a value storage; a Lock port; and a Lock Clear port, wherein: Lock register stores a first value written to the Lock port in the data storage if and only if the data storage is clear, and Lock register stores a second value written to the Lock Clear port in the data storage if and only if a writer of the value has an ID that matches a second ID in the data storage.

An embodiment of the inventive concept includes a Lock register, comprising: data storage; a Lock port; and a Lock Clear port, wherein: Lock register stores a first value written to the Lock port in the data storage if and only if the data storage is clear, Lock register stores a second value written to the Lock Clear port in the data storage if and only if a writer of the value has an ID that matches a second ID in the data storage, and the Lock Clear port can receive any value.

An embodiment of the inventive concept includes a Lock register, comprising: data storage; a Lock port; and a Lock Clear port, wherein: Lock register stores a first value written to the Lock port in the data storage if and only if the data storage is clear, Lock register stores a second value written to the Lock Clear port in the data storage if and only if a writer of the value has an ID that matches a second ID in the data storage, the Lock Clear port can receive any value, and the Lock Clear port can receive a clear value to clear the data storage.

An embodiment of the inventive concept includes a Lock register, comprising: data storage; a Lock port; and a Lock Clear port, wherein: Lock register stores a first value written to the Lock port in the data storage if and only if the data storage is clear, Lock register stores a second value written to the Lock Clear port in the data storage if and only if a writer of the value has an ID that matches a second ID in the data storage, the Lock Clear port can receive any value, and the Lock Clear port can receive a 0 value to clear the data storage.

An embodiment of the inventive concept includes a Lock register, comprising: data storage; a Lock port; a Lock Clear port; and a mailbox to store data to be shared between a sender and a recipient, wherein: Lock register stores a first value written to the Lock port in the data storage if and only if the data storage is clear, and Lock register stores a second value written to the Lock Clear port in the data storage if and only if a writer of the value has an ID that matches a second ID in the data storage.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, and the Lock register stores a second value written to the Lock Clear port in the data storage if and only if a second process in the processor of the value has an ID that matches a second ID in the data storage; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, the Lock register stores a second value written to the Lock Clear port in the data storage if and only if a second process in the processor of the value has an ID that matches a second ID in the data storage; and the Lock register ignores the first value written to the Lock port if the data storage is not clear; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if a third value stored in the data storage is 0, the Lock register stores a second value written to the Lock Clear port in the data storage if and only if a second process in the processor of the value has an ID that matches a second ID in the data storage; and the Lock register ignores the first value written to the Lock port if the data storage is not clear; and a mailbox associated with the Lock register to store data to be shared between a sender and a recipient.

An embodiment of the inventive concept includes a system, comprising: a processor; a Lock register, including: data storage including a claim ID storage to store the second ID and a value storage; a Lock port; and a Lock Clear port, wherein: the Lock register stores a first value in the data storage written to the Lock port by a first process running in the processor if and only if the data storage is clear, and the Lock register stores a second value written to the Lock Clear port in the data storage if and only if a second process in the processor of the value has an ID that matches a second ID in the data storage; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, the Lock register stores a second value written to the Lock Clear port in the data storage if and only if a second process in the processor of the value has an ID that matches a second ID in the data storage, and the Lock Clear port can receive any value; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, the Lock register stores a second value written to the Lock Clear port in the data storage if and only if a second process in the processor of the value has an ID that matches a second ID in the data storage, the Lock Clear port can receive any value, and the Lock Clear port can receive a clear value to clear the data storage; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, the Lock register stores a second value written to the Lock Clear port in the data storage if and only if a second process in the processor of the value has an ID that matches a second ID in the data storage, the Lock Clear port can receive any value, and the Lock Clear port can receive a 0 value to clear the data storage; and a mailbox associated with the Lock register to store data to be shared between a sender and a recipient.

An embodiment of the inventive concept includes a system, comprising: a processor; a Lock register, including: data storage; a Lock port; and a Lock Clear port, wherein: the Lock register stores a first value in the data storage written to the Lock port by a first process running in the processor if and only if the data storage is clear, and the Lock register stores a second value written to the Lock Clear port in the data storage if and only if a second process in the processor of the value has an ID that matches a second ID in the data storage; and a mailbox associated with the Lock register to store data to be shared between a sender and a recipient, wherein the Lock register includes the mailbox.

An embodiment of the inventive concept includes a method, comprising: writing a claim ID to a Lock port on a Lock register; verifying that the Lock register stores the claim ID; and writing data to a mailbox associated with the Lock register.

An embodiment of the inventive concept includes a method, comprising: writing a claim ID to a Lock port on a Lock register; verifying that the Lock register stores the claim ID, including: reading the Lock register, and if the Lock register does store the claim ID, re-writing the claim ID to the Lock port on the Lock register; and writing data to a mailbox associated with the Lock register.

An embodiment of the inventive concept includes a method, comprising: writing a claim ID to a plurality of Lock ports on a plurality of Lock registers; verifying that a first Lock register of the plurality of Lock registers stores the claim ID; and writing data to a mailbox associated with the first Lock register.

An embodiment of the inventive concept includes a method, comprising: writing a claim ID to a plurality of Lock ports on a plurality of Lock registers; verifying that a first Lock register of the plurality of Lock registers stores the claim ID; writing data to a mailbox associated with the first Lock register; identifying a second Lock register of the plurality of Lock registers stores the claim ID; and releasing the second Lock register.

An embodiment of the inventive concept includes a method, comprising: writing a claim ID to a plurality of Lock ports on a plurality of Lock registers; verifying that a first Lock register of the plurality of Lock registers stores the claim ID; writing data to a mailbox associated with the first Lock register; identifying a second Lock register of the plurality of Lock registers stores the claim ID; and releasing the second Lock register, including writing a clear value to the second Lock register.

An embodiment of the inventive concept includes a method, comprising: writing a claim ID to a plurality of Lock ports on a plurality of Lock registers; verifying that a first Lock register of the plurality of Lock registers stores the claim ID; writing data to a mailbox associated with the first Lock register; identifying a second Lock register of the plurality of Lock registers stores the claim ID; and releasing the second Lock register, including writing a 0 value to the second Lock register.

An embodiment of the inventive concept includes a method, comprising: writing a claim ID to a Lock port on a Lock register; verifying that the Lock register stores the claim ID; writing data to a mailbox associated with the Lock register; waiting until the data is read from the mailbox; and releasing the Lock register.

An embodiment of the inventive concept includes a method, comprising: writing a claim ID to a Lock port on a Lock register; verifying that the Lock register stores the claim ID; writing data to a mailbox associated with the Lock register; waiting until the data is read from the mailbox; and releasing the Lock register, including writing a clear value to the Lock register.

An embodiment of the inventive concept includes a method, comprising: writing a claim ID to a Lock port on a Lock register; verifying that the Lock register stores the claim ID; writing data to a mailbox associated with the Lock register; waiting until the data is read from the mailbox; and releasing the Lock register, including writing a 0 value to the Lock register.

An embodiment of the inventive concept includes a method, comprising: writing a claim ID to a Lock port on a Lock register; verifying that the Lock register stores the claim ID; and writing data to a mailbox associated with the Lock register, wherein the Lock register includes the mailbox.

An embodiment of the inventive concept includes a method, comprising: receiving a claim ID from a first process at a Lock port on a Lock register; identifying a first value currently stored in the Lock register; and if the first value currently stored in the Lock register is a clear value, storing the claim ID in the Lock register.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving a second claim ID from a second process at the Lock port on the Lock register; and discarding the second claim ID.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving a second value from a third process at a Lock Clear port on the Lock register; determining if the third process is first process; and if the third process is the first process, then writing the second value to the Lock register.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving a second value from a third process at a Lock Clear port on the Lock register; determining if the third process is first process; if the third process is the first process, then writing the second value to the Lock register; and if the third process is not the first process, discarding the second value.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving a clear value from a third process at a Lock Clear port on the Lock register; determining if the third process is first process; and if the third process is the first process, then writing the second value to the Lock register.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving a 0 value from a third process at a Lock Clear port on the Lock register; determining if the third process is first process; and if the third process is the first process, then writing the second value to the Lock register.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving data from a sender to share with a recipient; and storing the data in a mailbox in the Lock register.

An embodiment of the inventive concept includes a method, comprising: receiving a claim ID from a first process at a Lock port on a Lock register; identifying a first value currently stored in the Lock register; if the first value currently stored in the Lock register is a clear value, storing the claim ID in the Lock register; receiving data from a sender to share with a recipient; storing the data in a mailbox in the Lock register; receiving a request for the data in the mailbox in the Lock register from the recipient; and sending the data to the recipient.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A computer system comprising:
   a processor, the processor running at least one of a sender process and a recipient process;
   memory to store a plurality of mailboxes operative to store data to be shared between the sender process and the recipient process; and
   a plurality of Lock registers, each Lock register of the plurality of Lock registers associated with one mailbox of the plurality of mailboxes, each Lock register including:
   Data storage,
   A Lock port,
   A Lock Clear port;
   wherein the writer is operative to write a first claim ID to the Lock port of the plurality of Lock registers, verify for each Lock register of the plurality of Lock registers if it stores the first claim ID, and after verifying that a first Lock register stores the first claim ID, releasing at least one of the remainder of the plurality of Lock registers that stores the first claim ID;
   wherein each of the plurality of Lock registers stores a claim ID written to the Lock port in the data storage if and only if the data storage is clear; and
   each of the plurality of Lock registers stores a value written to the Lock clear port in the data storage if an only if a writer of the value has a process ID that matches the stored claim ID in the data storage.

2. A computer system according to claim 1, wherein each of the Lock registers ignores any claim ID written to the Lock port if the data storage is not clear.

3. A computer system according to claim 2, wherein the data storage of each of the plurality of Lock registers is clear if a value stored in the data storage is 0.

4. A computer system according to claim 1, wherein the data storage of each of the plurality of Lock registers includes a claim ID storage to store the claim ID written to the lock port and a value storage.

5. A computer system according to claim 1, wherein the Lock Clear port on each of the plurality of Lock registers can receive any value.

6. A computer system according to claim 5, wherein the Lock Clear port on each of the plurality of Lock registers can receive a clear value to clear the data storage.

7. A computer system according to claim 6, wherein the Lock Clear port on each of the plurality of Lock registers can receive a 0 value to clear the data storage.

8. A method, comprising:
   writing a claim ID to a plurality of Lock ports on a plurality of Lock registers;
   verifying that a first Lock register of the plurality of Lock registers stores the claim ID;
   identifying a second Lock register of the plurality of Lock registers that stores the claim ID;
   releasing the second Lock register; and
   writing data to a mailbox associated with the first Lock register.

9. A method according to claim 8, wherein verifying that a first Lock register of the plurality of Lock registers stores the claim ID includes:
   reading each of the plurality of Lock registers; and
   if the first Lock register does store the claim ID, re-writing the claim ID to the Lock port on the first Lock register.

10. A method according to claim 8, wherein releasing the second Lock register includes writing a clear value to the second Lock register.

11. A method according to claim 10, wherein writing a clear value to the second Lock register includes writing a 0 to the second Lock register.

12. A method, comprising:

receiving a claim ID from a first process at a plurality of Lock ports on a plurality of Lock registers;

identifying a first value currently stored in the plurality of Lock registers;

for each Lock register of the plurality of Lock registers, if the first value currently stored in the Lock register is a clear value, storing the claim ID in the Lock register;

verifying that at least a first Lock register of the plurality of Lock registers stores the claim ID;

identifying a second Lock register of the plurality of Lock registers that stores the claim ID; and releasing the second Lock register.

13. A method according to claim 12, further comprising:

receiving a second claim ID from a second process at the Lock port on the first Lock register; and discarding the second claim ID.

14. A method according to claim 12, further comprising:

receiving a second value from a third process at a Lock Clear port on the first Lock register;

determining if the third process is first process; and if the third process is the first process, then writing the second value to the first Lock register.

15. A method according to claim 14, further comprising:

if the third process is not the first process, discarding the second value.

16. A method according to claim 14, wherein receiving a second value from a third process at a Lock Clear port on the first Lock register includes receiving a clear value from the third process at the Lock Clear port on the first Lock register.

17. A method according to claim 16, wherein receiving a clear value from the third process at the Lock Clear port on the first Lock register includes receiving a 0 value from the third process at the Lock Clear port on the first Lock register.

\* \* \* \* \*